United States Patent

Ohsaku et al.

[11] Patent Number: 6,055,471
[45] Date of Patent: Apr. 25, 2000

[54] SPRUNG MASS ESTIMATING APPARATUS

[75] Inventors: Satoru Ohsaku, Toyota; Hideo Nakai, Aichi-ken, both of Japan

[73] Assignee: Toyota Jidosha Kabushiki Kaisha, Toyota, Japan

[21] Appl. No.: 09/333,287

[22] Filed: Jun. 15, 1999

[30] Foreign Application Priority Data

Jul. 6, 1998 [JP] Japan .................................. 10-190548

[51] Int. Cl.$^7$ ............................ B60G 23/00; B60G 21/00
[52] U.S. Cl. ................................ 701/37; 701/38; 280/5.5; 280/5.505; 280/5.515; 248/550; 248/636
[58] Field of Search .................... 701/37, 38; 188/266.1, 188/266.2, 281; 280/5.5, 5.505, 5.515; 248/550, 636

[56] References Cited

U.S. PATENT DOCUMENTS

| | | | |
|---|---|---|---|
| 4,700,971 | 10/1987 | Doi et al. | 280/707 |
| 4,969,662 | 11/1990 | Stuart | 280/707 |
| 5,732,370 | 3/1998 | Boyle et al. | 701/37 |
| 5,781,873 | 7/1998 | Sasaki | 701/37 |

FOREIGN PATENT DOCUMENTS

1-293211  11/1989  Japan .
7-27907   5/1995   Japan .
8-304154  11/1996  Japan .

*Primary Examiner*—William A. Cuchlinski, Jr.
*Assistant Examiner*—Yonel Beaulieu
*Attorney, Agent, or Firm*—Oliff & Berridge, PLC

[57] ABSTRACT

A sprung mass estimating apparatus applied to a vehicle having a suspension device detects a sprung mass acceleration "a" and an amount of relative displacement "s" of a sprung member relative to an unsprung member by using an acceleration sensor and a stroke sensor, respectively. The apparatus calculates a relative velocity ds/dt based on the amount of relative displacement "s". The apparatus then derives a damping force F corresponding to the relative velocity ds/dt and a set switch level of the damping coefficient, with reference to a damping force characteristic table. Based on a data row a(k), a data row s(k) and a data row F(k) (where k=1, 2, . . . , N) indicating sprung mass accelerations "a", amounts of relative displacement "s", and damping forces F obtained over such a sufficiently long time that the ratio $\beta$ of the spring constant to the sprung mass M can be considered constant, the apparatus calculates a sprung mass M. Therefore, the apparatus is able to estimate a sprung mass even during a vehicle travel, without requiring a complicated construction.

18 Claims, 4 Drawing Sheets

SPRUNG MASS ESTIMATING APPARATUS

INCORPORATION BY REFERENCE

The disclosure of Japanese Patent Application No. HEI 10-190548 filed on Jul. 6, 1998 including the specification, drawings and abstract are incorporated herein by reference in its entirety.

BACKGROUND OF THE INVENTION

1. Field of Invention

The present invention relates to a sprung mass estimating apparatus for estimating the mass of a sprung member of a vehicle.

2. Description of Related Art

Related conventional apparatuses are described in, for example, Japanese Utility Model Application Laid-Open No. HEI 7-27907 and Japanese Patent Application Laid-Open No. HEI 1-293211. The apparatuses detect an air pressure in a pneumatic spring mechanism, and estimate the sprung mass (movable load) in the pneumatic spring mechanism from the detected air pressure, based on the fact that the air pressure is proportional to the sprung mass in the mechanism. In accordance with the estimated sprung mass, the apparatuses change the damping force characteristic of a damping force generating mechanism, or adjust the amount of air supplied into or discharged from the pneumatic spring mechanism. Japanese Patent Application Laid-Open No. HEI 8-304154, as for example, discloses a technology that detects a sprung mass (movable load) based on the amount of displacement of a spring disposed between a vehicle body and an axle, and displays the sprung mass on a display device provided near a driver's seat.

The above-described conventional apparatuses are able to accurately detect the sprung mass if the sprung member (vehicle body) is not oscillating, for example, when the vehicle remains stopped. However, when the vehicle is moving, that is, when the sprung member is oscillating, the air pressure in the pneumatic spring mechanism fluctuates, so that the conventional apparatuses cannot accurately detect the sprung mass. Moreover, the related technology employing a pneumatic spring mechanism as described above, in particular, requires a dedicated pressure sensor provided in the air spring mechanism.

SUMMARY OF THE INVENTION

Accordingly, it is an object of the present invention to provide a sprung mass estimating apparatus capable of always estimating the sprung mass with a high precision while requiring only a simple construction.

In accordance with one aspect of the invention, there is provided a sprung mass estimating apparatus for an application to a vehicle having a suspension apparatus including a pneumatic spring mechanism and a damping force generator that are disposed between a sprung member and an unsprung member, the sprung mass estimating apparatus estimating a mass of the sprung member, the sprung mass estimating apparatus including an acceleration detector that detects an acceleration of the sprung member in upward and downward directions; a relative displacement detector that detects an amount of relative displacement of the sprung member relative to the unsprung member in the upward and downward directions; a damping force detector that detects a damping force generated by the damping force generator, and a sprung processor that determines the mass of the sprung member based on a plurality of accelerations, a plurality of amounts of relative displacement, and a plurality of damping forces detected over a predetermined length of time by the acceleration detector, the relative displacement detector, and the damping force detector, respectively.

In the sprung mass estimating apparatus, the computation device is able to estimate the sprung mass with a good precision even during a vehicle travel, by using a plurality of accelerations, a plurality of amounts of relative displacement, and a plurality of damping forces.

The damping force generated by the damping force generating mechanism is determined by the construction of the mechanism and the velocity of the sprung member relative to the unsprung member. Therefore, in the above-described sprung mass estimating apparatus, the damping force detection device may include a relative velocity detection device for detecting a relative velocity of the sprung member relative to the unsprung member in the upward and downward directions, a memory storing data indicating the damping force corresponding to the relative velocity, and a derivation device for deriving a damping force corresponding to the relative velocity detected by the relative velocity detection device, with reference to the memory.

The aforementioned relative velocity can easily be calculated on the basis of an output of a relative displacement detecting sensor that is often used for a normal damping force control and the like. Therefore, the sprung mass estimating apparatus is able to estimate the sprung mass through a suitably contrived software operation executed by a microcomputer or the like, while requiring only a simple hardware construction, that is, without employing a special sensor, for example, a pressure sensor as mentioned above in conjunction with the related technologies.

The aforementioned data stored in the memory and indicating damping forces may vary for individual damping coefficient switch levels of the damping force generating mechanism.

Furthermore, the computation device may calculate the mass of the sprung member by using a relationship expressed as $M(a-\beta s)=F$ where $M$ is the mass of the sprung member, $a$ is the acceleration; $\beta$ is a ratio of a spring constant of the spring mechanism to the mass of the sprung member, $s$ is the amount of relative displacement; and $F$ is the damping force, under a condition that the ratio $\beta$ is constant.

The principle of the above-described optional construction according to the invention will be explained. The ratio between the spring constant of the pneumatic spring mechanism and the sprung mass is substantially constant in a static state. Therefore, the ratio can be considered constant provided that the aforementioned predetermined length of time is a sufficiently long time, for example, at least 10 times the resonance period of the sprung member. The equation of motion $M(a-\beta s)=F$ is established, where $M$ is the sprung mass; $a$ is the acceleration; $\beta$ is the ratio; $s$ is the amount of relative displacement; and $F$ is the damping force. Consequently, by using a plurality of accelerations, a plurality of amounts of relative displacement, and a plurality of damping forces that are obtained over such a sufficiently long time that the ratio $\beta$ can be considered constant (i.e., at least 10 times the resonance period of the sprung member), the computation device is able to estimate the sprung mass with a high precision even during a vehicle travel.

The foregoing and further objects, features and advantages of the present invention will become apparent from the following description of a preferred embodiment with reference to the accompanying drawings, wherein like numerals are used to represent like elements and wherein:

DETAILED DESCRIPTION OF PREFERRED EMBODIMENTS

Before the description of a preferred embodiment of the sprung mass estimating apparatus, a theoretical explanation of a sprung mass estimating method employed in the apparatus of the invention will be made below.

If a sprung mass M in a vehicle is moving at an acceleration a(k) in a vertical direction (the upward direction being positive) at a given moment, the following equation of motion is provided.

$$Ma(k) = Ks(k)s(k) + F(k) \quad (1)$$

where Ks(k) is the pneumatic spring constant of a spring mechanism in a suspension device at that moment; s(k) is the amount of displacement of the sprung member relative to an unsprung member at that moment (the direction of contraction of the suspension device being positive); F(k) is the damping force provided by a damper in the suspension device (the upward direction being positive) at that moment and k in the parentheses is a positive integer indicating the number of times of updating.

Using the ratio β(k) (=Ks(k)/M) of the spring constant Ks(k) to the sprung mass M, equation (1) can be written as equation (2):

$$M\{a(k) - \beta(k)s(k)\} = F(k) \quad (2)$$

A typical vehicular suspension apparatus employing an air spring mechanism is designed so that the ratio β(k) of the spring constant Ks to the sprung mass M is substantially constant in a static state. Therefore, with respect to the vertical acceleration a(k), the spring constant Ks(k), the amount of relative displacement s(k) and the damping force F(k) over such a sufficiently long time that the ratio β(k) can be handled as a constant value β (mean value) (e.g., at least 10 times the resonance period of the sprung mass), that is, such a length of time that the following equation (3) holds, equation (2) can be written as equation (4):

$$\beta = \sum_{k=1}^{N}(1/N)\beta(k) \quad (3)$$

$$M\{a(k) - \beta s(k)\} = F(k) \quad (4)$$

Then, the sprung mass M can be accurately estimated by, for example, using equation (5) based on the least squares method.

$$M = \frac{\sum_{k=1}^{N} F(k) \cdot \{a(k) - \beta \cdot s(k)\}}{\sum_{k=1}^{N} \{a(k) - \beta \cdot s(k)\}^2} \quad (5)$$

Figure 1:
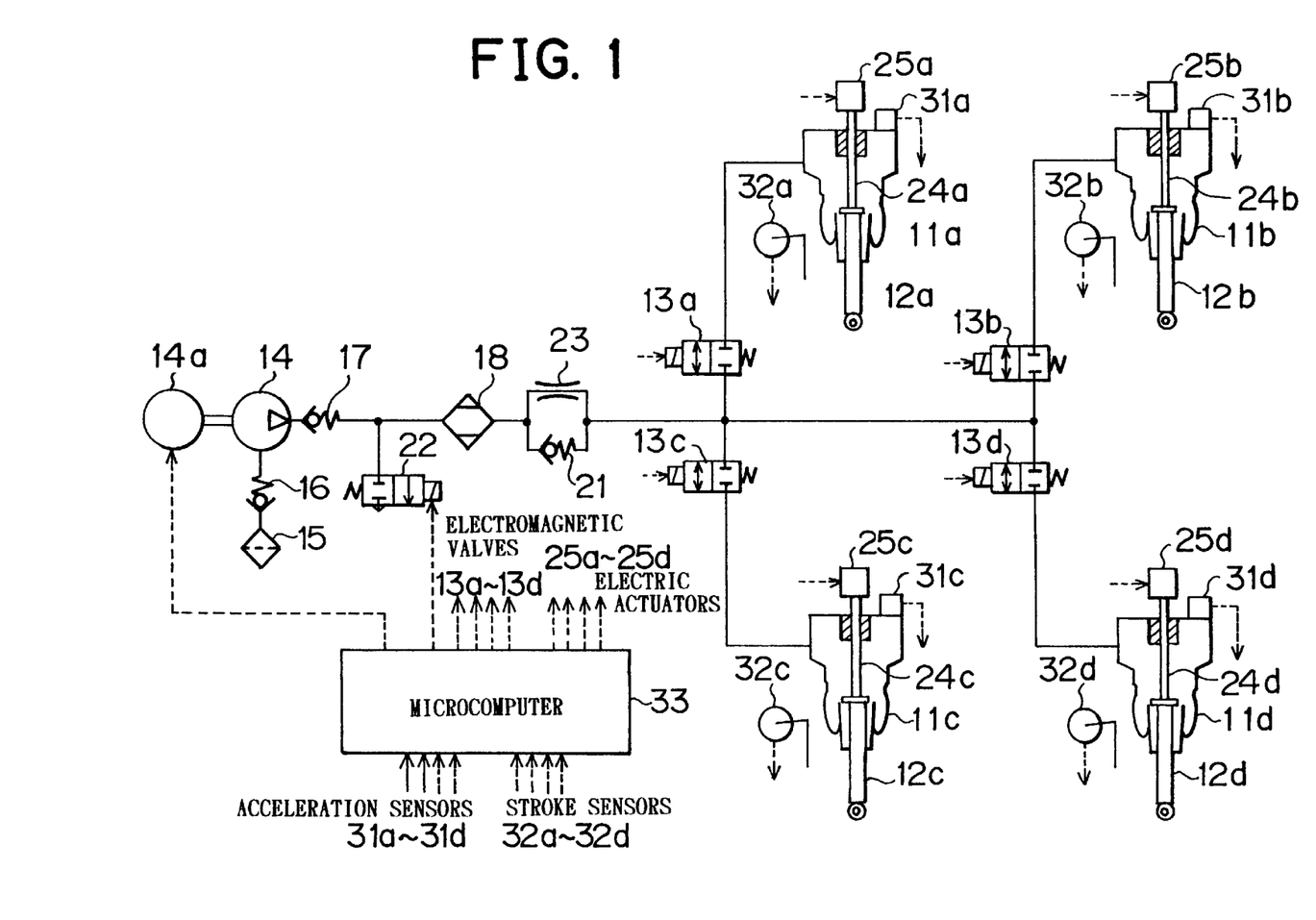
FIG. 1 is a schematic illustration of the overall construction of a vehicular suspension apparatus to which a first embodiment of the sprung mass estimating apparatus of the invention is applied.

A preferred embodiment of the invention employing the above-explained theory will now be described with reference to the accompanying drawings. FIG. 1 is a schematic illustration of the overall construction of a vehicular suspension apparatus to which the sprung mass estimating apparatus of the invention is applied.

The suspension apparatus has air chambers 11a–11d, that is, pneumatic spring mechanisms, and dampers 12a–12d, that is, damping force generating mechanisms, at positions corresponding to front left and right wheels and rear left and right wheels, respectively.

The air chambers 11a–11d elastically support a vehicle body, and are connected to a compressor 14 via electromagnetic valves 13a–13d, respectively. The electromagnetic valves 13a–13d are electrically controlled so as to perform switching between valve states, that is, so as to selectively open and close air passages to the dampers 12a–12d, respectively. The compressor 14 is driven by an electric motor 14a to suck air from outside via a filter 15 and a check valve 16 and eject compressed air selectively to the electromagnetic valves 13a–13d via a dryer 18 and a check valve 21. An electromagnetic valve 22 is connected between the check valve 17 and the dryer 18. The electromagnetic valve 22 is also electrically switched so as to selectively discharge air supplied thereto from the air chambers 11a–11d via the electromagnetic valves 13a–13d and a fixed orifice 23, to the outside.

The dampers 12a–12d cooperate with the air chambers 11a–11d to support the vehicle body at the corresponding wheel positions and damp oscillations of the vehicle body. The dampers 12a–12d have piston rods 24a–24d, respectively, which are protruded from upper end faces thereof. The piston rods 24a–24d are connected to electric actuators 25a–25d such as step motors or the like, respectively. The electric actuators 25a–25d are electrically controlled to switch the damping coefficients of the dampers 12a–12d, respectively, to a plurality of levels (for example, q levels).

This suspension apparatus also incorporates acceleration sensors 31a–31d and stroke sensors 32a–32d at the four wheel positions. The acceleration sensors 31a–31d are secured to a sprung member, and individually detect the acceleration "a" of the sprung member in vertical directions, where upward accelerations a are expressed as positive values, and downward accelerations a are expressed as negative values. The stroke sensors 32a–32d are disposed between the sprung member and an unsprung member, and individually detect the amount of displacement "s" of the sprung member relative to the unsprung member. Amounts of relative displacement s in a direction of decreases from a predetermined reference value (i.e., the direction of contraction of the dampers 12a–12d) are expressed as positive values, and amounts of relative displacement s in the direction of increases from the predetermined reference value (i.e., the direction of expansion of the dampers 12a–12d) are expressed as negative values.

The acceleration sensors 31a–31d and the stroke sensors 32a–32d are connected to a microcomputer 33. The microcomputer 33 repeatedly executes programs corresponding to the flowcharts in FIGS. 2 and 3, at short time intervals, to adjust a vehicle height by calculating a sprung mass M at each wheel position, changing the damping coefficients of the suspension apparatus through control of the electric actuators 25a–25d, and controlling the electromagnetic valves 13a–13d and the electric motor 14a. A damping force characteristic table as indicated in FIG. 4 is provided in the microcomputer 33. The damping force characteristic table contains pre-stored data measured separately for the individual levels 1 through q of the damping coefficient of the dampers 12a–12d, that is, data of the damping force F varying corresponding to the relative velocity ds/dt of the sprung member relative to the unsprung member separately for the individual damping coefficient levels 1 through q.

Figure 2:
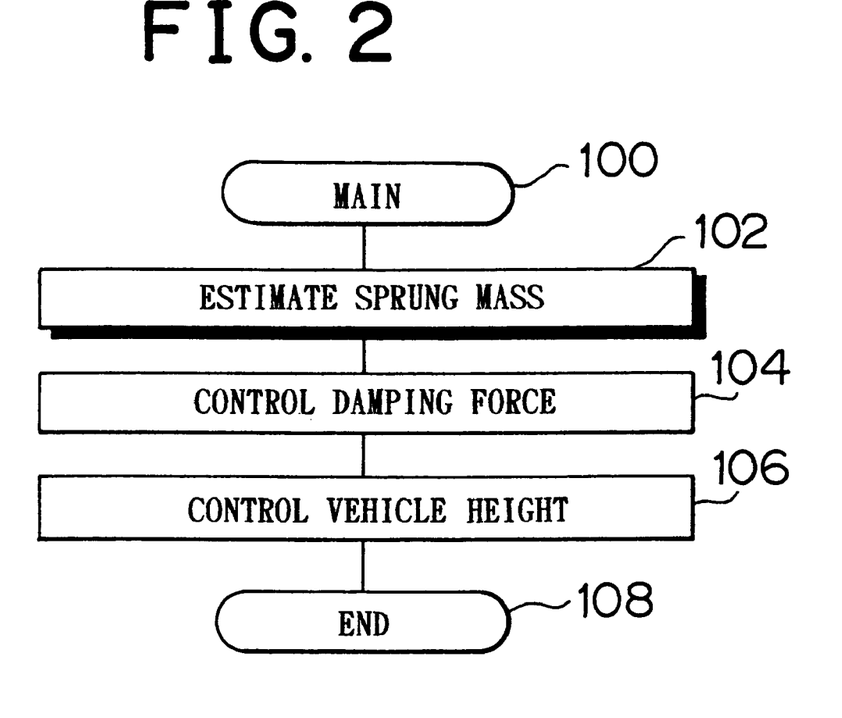
FIG. 2 is a flowchart illustrating a main program executed by a microcomputer shown in FIG. 1.

Operations of the embodiment constructed as described above will be described with reference to the flowcharts in FIGS. 2 and 3. When an ignition switch (not shown) is turned on, the microcomputer 33 repeats execution of a main program including steps 100 through 108 at predetermined short time intervals. After starting the main program in step 100, the microcomputer 33 executes a sprung mass estimating routine in step S102.

Figure 3:
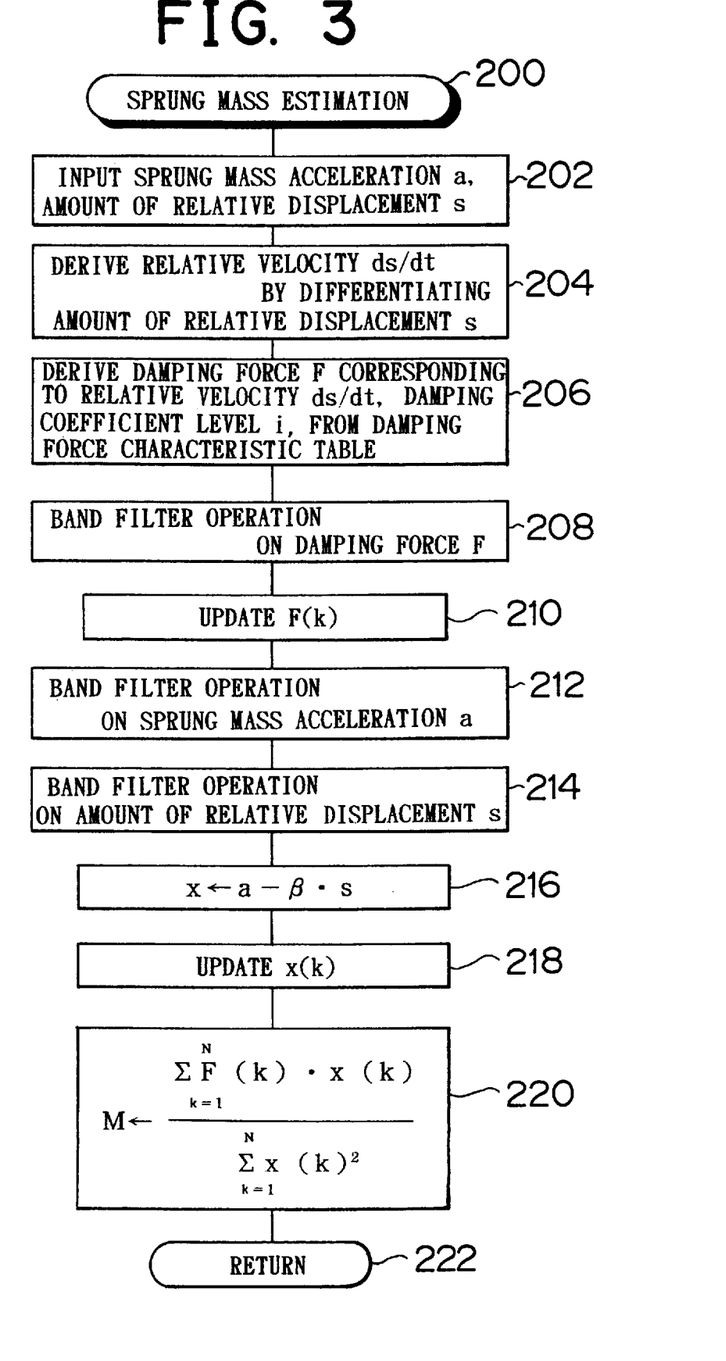
FIG. 3 is a flowchart illustrating in detail a sprung mass estimating routine shown in FIG. 2.
Figure 4:
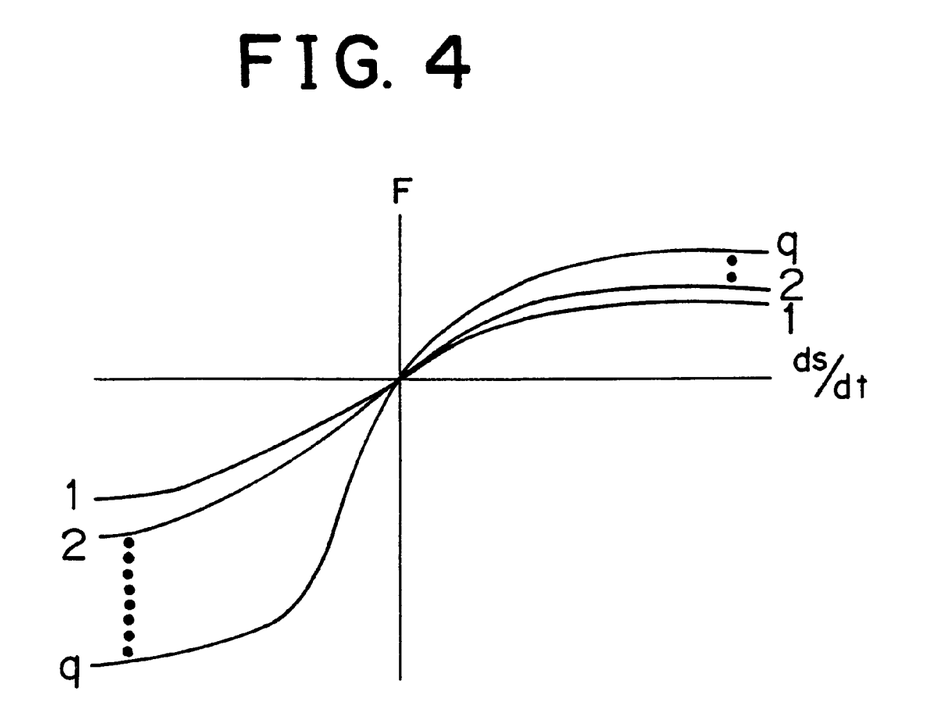
FIG. 4 is a graph indicating damping force characteristics stored in a damping force characteristic table provided in the microcomputer.

The sprung mass estimating routine is illustrated in detail in FIG. 3. After starting the sprung mass estimating routine in step 200, the microcomputer 33 inputs a sprung mass acceleration a and an amount of relative displacement s from each of the acceleration sensors 31a–31d and each of the stroke sensors 32a–32d, respectively, and stores those data in step 202. With regard to values indicating the sprung mass acceleration a and the amount of relative displacement s, the values inputted in the present cycle and the values inputted in an appropriate number of preceding cycles are stored for use in a differentiation operation and a band pass operation described below. Subsequently in step 204, a relative velocity ds/dt of the sprung member relative to the unsprung member at each wheel position is calculated through differentiation of the amount of relative displacement s using the present and previous inputs of the amount of relative displacement s. Although various calculations using sprung mass accelerations a, amounts of relative displacement s, and relative velocities ds/dt are actually performed with respect to the individual wheel positions, only the calculations with respect to one wheel position will be described in the following description, in order to simplify the description.

Subsequently in step 206, the microcomputer 33 derives a damping force F corresponding to the relative velocity ds/dt calculated in step 204 and the damping coefficient level number i (one of 1 through q) with reference to the damping force characteristic table pre-stored in a memory of the microcomputer 33. As for the damping coefficient level number i, the microcomputer 33 uses a number set in a damping force control routine in step 104 (described below) of the main program. With regard to the damping force F, the value derived in the present cycle and the values derived in an appropriate number of preceding cycle are stored in order to use the values in the band pass operation described below.

Subsequently in step 208, the microcomputer 33 performs a band pass filter operation on the damping forces F derived by the operation in step 206 in the present and preceding cycles, in order to remove direct-current (DC) components and noise components contained in the damping forces F. Subsequently in step 210, the microcomputer 33 updates a row of an N number of data F(k) where k=1, 2, ..., N, in accordance with elapse of time. In the data row F(k), a greater number k of 1 through N indicates a newer data. Therefore, in updating the data row F(k), the microcomputer 33 erases data F(1), and sets the present data F(2), F(3), ..., F(N) as F(1), F(2), ..., F(N–1), and sets the new damping force F obtained by the band pass filter operation in step 208 in the present cycle as data F(N), and stores those updated data. The data row F(k) constitutes, together with another data row x(k) described below, a set of data obtained over a period of time (at least 10 times the resonance period (0.5–1.0 second) of the sprung member) that is sufficiently long so that the ratio Ks/M of the spring constant Ks of the air chamber 11a–11d to the sprung mass M at each wheel position can be handled as a fixed value. In this embodiment, the sampling cycle (data set updating cycle) is set to about 5 to 20 milliseconds, and the number N is set to about 3000.

In step 212 following step 210, the microcomputer 33 performs a band pass filter operation on the sprung mass accelerations a inputted in step 202 in the present and preceding cycles, in order to remove the DC components and noise components contained in the sprung mass accelerations a detected by the acceleration sensor 31a (31b–31d). Subsequently in step 214, the microcomputer 33 performs a band pass filter operation on the amounts of relative displacement s inputted in step 202 in the present and preceding cycles, in order to remove the DC components and noise components contained in the amounts of relative displacement s detected by the stroke sensor 32a (32b–32d). Subsequently in step 216, the microcomputer 33 calculates a value x through execution of equation (6):

$$x = a - \beta s \tag{6}$$

where β is a constant corresponding to the mean of the ratios Ks/M occurring over such a long period of time that the ratios Ks/M of the spring constant Ks to the sprung mass M can be handled as a constant value. Subsequently in step 218, the microcomputer 33 updates the data row x(k) of an N number of data indicating the values x (where k=1, 2, ..., N) in accordance with elapse of time, in the same manner as in the update of the data row F(k).

Subsequently in step 220, the microcomputer 33 calculates a sprung mass M through execution of equation (7) using the least squares method.

$$M = \frac{\sum_{k=1}^{N} F(k) \cdot x(k)}{\sum_{k=1}^{N} x(k)^2} \tag{7}$$

Subsequently in step 222, the microcomputer 33 ends the present cycle of the sprung mass estimating routine.

After the sprung mass estimating routine, the microcomputer 33 performs the damping force control routine in step 104 and then a vehicle height control routine in step 106. Subsequently in step 108, the microcomputer 33 ends the present cycle of the main program.

In the damping force control routine in step 104, the microcomputer 33 determines a level number i of the damping coefficient of each of the dampers 12a–12d by a well-known method, and corrects the determined damping coefficient level number i in accordance with the sprung mass M estimated in the sprung mass estimating routine, and correspondingly controls the driving of the electric actuators 25a–25d, so as to set the damping coefficient of each damper 12a–12d to a value corresponding to the corrected level number i. The aforementioned well-known method may be, for example, a method in which a damping coefficient of each damper 12a–12d is determined in proportion to the ratio of the sprung mass acceleration a to the relative velocity ds/dt on the basis of the value of sprung mass acceleration a and the value of relative velocity ds/dt inputted and calculated in the sprung mass estimating routine, or a method in which a damping coefficient of each damper $12a$–$12d$ is determined on the basis of a road surface condition estimated in accordance with the magnitude of a sprung mass acceleration a, or the like. In the correction of the damping coefficient level number i using the sprung mass M, it may be preferable to correct a control gain with respect to the damping coefficient determined by the well-known method so that the control gain increases with increases in the sprung mass M, or to define a minimum value of the damping coefficient of the dampers $12a$–$12d$ so that the minimum value increases with increases in the sprung mass M, in order to secure a vehicle running stability. In the damping force control routine, the corrected damping coefficient level number i is stored into the microcomputer 33 for use in the sprung mass estimating routine.

In the vehicle height control routine in step 106, the microcomputer 33 adjusts the amount of air contained in each of the air chambers $11a$–$11d$ to adjust the vehicle height at each wheel position to a target vehicle height by controlling the electric motor $14a$ and the electromagnetic valves $13a$–$13d$ and 22 so that the amount of relative displacement s (actual vehicle height) inputted in the sprung mass estimating routine becomes equal to the target vehicle height. In the vehicle height control routine, too, it may be preferable to limit the increase of the target vehicle height by using the estimated sprung mass M if the sprung mass M is great, in order to secure a vehicle running stability.

As can be understood from the foregoing description, the embodiment is able to estimate a sprung mass M with a high precision even during a vehicle travel, by using the data rows a(k), s(k) and F(k) (where k=1, 2, . . . , N) indicating sprung mass accelerations a, amounts of relative displacement s, and damping forces F obtained over such a long time that the spring constants of the air chambers $11a$–$11d$ can be handled as a substantially fixed value. The sprung mass acceleration a and the amount of relative displacement s can be detected by using the acceleration sensors $31a$–$31d$ and the stroke sensors $32a$–$32d$, which are often used for an ordinary damping force control. The damping force F can be derived on the basis of the damping coefficient level number i of each damper $12a$–$12d$ set in the damping force control routine and the relative velocity ds/dt calculated from amounts of relative displacement s, by using the damping force characteristic table as a reference. Therefore, the embodiment is able to calculate a sprung mass M without using a special or dedicated sensor, but merely through the suitably contrived software operations executed by the microcomputer 33. That is, the embodiment is able to estimate a sprung mass M while employing a simple hardware construction.

Although the foregoing embodiment estimates a sprung mass M based on equation (7) using the data rows F(k) and x(k) (where k=1, 2, . . . , N) in step 220, the operation in step 220 may be replaced by an operation of equation (5) using the data rows F(k), a(k) and s(k) (where k=1, 2, . . . , N) indicating damping forces F, sprung mass accelerations a, and amounts of relative displacement s, and a predetermined ratio β (constant), in order to calculate a sprung mass M.

If this operation is adopted, the operations in steps 216 and 218 in the foregoing embodiment are omitted, so that data rows a(k) and s(k) (where k=1, 2, . . . , N) detected over such a period of time that the ratio β can be considered as a constant, are prepared on the basis of the sprung mass accelerations a and the amounts of relative displacement s obtained in steps 212 and 214, and the prepared data rows a(k) and s(k) are used together with the data row F(k) indicating the damping forces F to execute equation (5).

Although the foregoing embodiment derives a damping force F corresponding to the damping coefficient level number i and the relative velocity ds/dt in step 206, a damping force F corresponding only to the relative velocity ds/dt may be derived in step 206 if the vehicle employs dampers incapable of changing the damping coefficient. In this case, a damping force characteristic table storing damping forces F varying in accordance with only the relative velocity ds/dt may be prepared in the microcomputer.

Furthermore, although the foregoing embodiment determines the result obtained by a single performance of the operation of step 220 as a sprung mass M, it is also possible to average a plurality of results obtained by performing step 220 a plurality of times and determine the mean value as a sprung mass M.

Further, although the foregoing embodiment repeatedly estimates a sprung mass M by constantly repeating the sprung mass estimating routine, it is also possible to perform the sprung mass estimating routine to update the sprung mass M only once after a door or a trunk lid is opened during a vehicle stop because the sprung mass M is normally changed by a change in the number or total weight of occupants, or a change in the baggage load. In this case, it is also possible to provide a vehicle speed sensor, and open-close switches for detecting whether a door or a trunk lid is opened or closed. In this construction, if the vehicle speed is equal to or lower than a predetermined very low speed and at least one of the open-close switches detects that a door or the trunk lid is opened, the above-described estimation of a sprung mass M is performed only once after the door or the trunk lid is closed. The estimated sprung mass M is repeatedly used until a door or the trunk lid is opened during a vehicle stop.

Still further, although the foregoing embodiment uses a least squares method to estimate a sprung mass M, it is also possible to use a generalized least squares method, a maximum likelihood method, a method of observed value of concomitant variable, or the like instead of the least squares method, in order to calculate a sprung mass. If a method of observed value of concomitant variable is employed, equation (4) can be written as equation (8), considering the sensor observation noise e(k).

$$M\{a(k)-\beta s(k)\}=F(k)+e(k) \qquad (8)$$

As for a concomitant variable, this method uses a control instruction value $f_{cr}(k)$ having no correlation with the sensor observation noise e(k) but having a strong correlation with the data row F(k), which is true output. The control instruction value $f_{cr}(k)$ indicates target damping forces calculated in step 104 in FIG. 2, whereas the damping force F(k) indicates actual damping forces of the dampers $12a$–$12d$. As for the control instruction value $f_{cr}(k)$, the target damping forces calculated in step 104 are stored in a time series, and appropriately used. With the control instruction value $f_{cr}(k)$, a sprung mass M can be calculated through equation (9):

$$M = \frac{\sum_{k=1}^{N} F(k) \cdot f_{cr}(k)}{\sum_{k=1}^{N} \{a(k) - \beta \cdot s(k)\} \cdot f_{cr}(k)} \qquad (9)$$

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A sprung mass estimating apparatus for an application to a vehicle having a pneumatic suspension apparatus including a pneumatic spring mechanism and a damping force generator that are disposed between a sprung member and an unsprung member, the sprung mass estimating apparatus estimating a mass of the sprung member, comprising:

an acceleration detector that detects an acceleration of the sprung member in upward and downward directions;

a relative displacement detector that detects an amount of relative displacement of the sprung member relative to the unsprung member in the upward and downward directions;

a damping force detector that detects a damping force generated by the damping force generator; and a sprung mass processor that determines the mass of the sprung member based on a plurality of accelerations, a plurality of amounts of relative displacement, and a plurality of damping forces detected over a predetermined length of time by the acceleration detector, the relative displacement detector, and the damping force detector, respectively.

2. A sprung mass estimating apparatus according to claim 1, wherein the predetermined length of time is set to such a sufficiently long time that a ratio between a spring constant of the spring mechanism and the mass of the sprung member is handled as a constant value.

3. A sprung mass estimating apparatus according to claim 2, wherein the damping force detector comprises:

a relative velocity detector that detects a relative velocity of the sprung member relative to the unsprung member in the upward and downward directions;

a memory that stores data indicating the damping force corresponding to the relative velocity; and a damping force processor that determines a damping force corresponding to the relative velocity detected by the relative velocity detector, with reference to the memory.

4. A sprung mass estimating apparatus according to claim 3, wherein the data stored in the memory and indicating damping forces vary for individual damping coefficient switch levels of the damping force generator.

5. A sprung mass estimating apparatus according to claim 4, wherein the sprung mass processor determines the mass of the sprung member on the basis of an equation of motion of the sprung member by using the plurality of accelerations, the plurality of amounts of relative displacement, and the plurality of damping forces.

6. A sprung mass estimating apparatus according to claim 5, wherein the equation of motion is an equation under a condition that a ratio of the spring constant of the spring mechanism to the mass of the sprung member is constant.

7. A sprung mass estimating apparatus according to claim 1, wherein the sprung mass processor determines the mass of the sprung member by using a relationship expressed as $M(a-\beta s)=F$ where M is the mass of the sprung member, a is the acceleration; $\beta$ is a ratio of a spring constant of the spring mechanism to the mass of the sprung member; s is the amount of relative displacement; and F is the damping force, under a condition that the ratio $\beta$ is constant.

8. A sprung mass estimating apparatus according to claim 2, wherein the sprung mass processor determines the mass of the sprung member on the basis of an equation of motion of the sprung member by using the plurality of accelerations, the plurality of amounts of relative displacement, and the plurality of damping forces.

9. A sprung mass estimating apparatus according to claim 8, wherein the equation of motion is an equation under a condition that a ratio of the spring constant of the spring mechanism to the mass of the sprung member is constant.

10. A sprung mass estimating apparatus according to claim 2, wherein the sprung mass processor determines the mass of the sprung member by using a relationship expressed as $M(a-\beta s)=F$ where M is the mass of the sprung member, a is the acceleration; $\beta$ is a ratio of a spring constant of the spring mechanism to the mass of the sprung member; s is the amount of relative displacement; and F is the damping force, under a condition that the ratio $\beta$ is constant.

11. A sprung mass estimating apparatus according to claim 1, wherein the damping force detector comprises:

a relative velocity detector that detects a relative velocity of the sprung member relative to the unsprung member in the upward and downward directions;

a memory storing data indicating the damping force corresponding to the relative velocity; and a damping force processor that determines a damping force that corresponds to the relative velocity detected by the relative velocity detector, with reference to the memory.

12. A sprung mass estimating apparatus according to claim 11, wherein the data stored in the memory and indicating damping forces vary for individual damping coefficient switch levels of the damping force generator.

13. A sprung mass estimating apparatus according to claim 1, wherein the sprung mass processor determines the mass of the sprung member on the basis of an equation of motion of the sprung member by using the plurality of accelerations, the plurality of amounts of relative displacement, and the plurality of damping forces.

14. A sprung mass estimating method for an application to a vehicle having a suspension apparatus including a pneumatic spring mechanism and a damping force generator that are disposed between a sprung member and an unsprung member, the sprung mass estimating method estimating a mass of the sprung member, comprising the steps of:

detecting an acceleration of the sprung member in upward and downward directions;

detecting an amount of relative displacement of the sprung member relative to the unsprung member in the upward and downward directions;

detecting a damping force generated by the damping force generator, and determining the mass of the sprung member based on a plurality of accelerations, a plurality of amounts of relative displacement, and a plurality of damping forces detected by the acceleration detecting step, the relative displacement detecting step, and the damping force detecting step, respectively, the plurality of accelerations, the plurality of amounts of relative displacement, and the plurality of damping forces being data obtained over a predetermined length of time.

15. A sprung mass estimating method according to claim 14, wherein the damping force detecting step comprises:

detecting a relative velocity of the sprung member relative to the unsprung member in the upward and downward directions; and determining a damping force that corresponds to the relative velocity, with reference to a memory storing data indicating a correspondence between the damping force and the relative velocity.

16. A sprung mass estimating method according to claim 15, wherein the predetermined length of time is set to such a sufficiently long time that a ratio between a spring constant of the spring mechanism and the mass of the sprung member is handled as a constant value.

17. A sprung mass estimating method according to claim 15, wherein the mass of the sprung member is determined on the basis of an equation of motion of the sprung member by using the plurality of accelerations, the plurality of amounts of relative displacement, and the plurality of damping forces.

18. A sprung mass estimating method according to claim 17, wherein the equation of motion is an equation under a condition that the ratio between the spring constant of the pneumatic spring mechanism and the mass of the sprung member is constant.

* * * * *